(12) United States Patent
Murakami

(10) Patent No.: US 9,691,197 B2
(45) Date of Patent: Jun. 27, 2017

(54) DATA PROCESSING APPARATUS FOR VEHICLE

(71) Applicant: DENSO CORPORATION, Kariya, Aichi-pref. (JP)

(72) Inventor: Toshiyuki Murakami, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 21 days.

(21) Appl. No.: 14/768,724

(22) PCT Filed: Jan. 27, 2014

(86) PCT No.: PCT/JP2014/000383
§ 371 (c)(1),
(2) Date: Aug. 18, 2015

(87) PCT Pub. No.: WO2014/129112
PCT Pub. Date: Aug. 28, 2014

(65) Prior Publication Data
US 2016/0005245 A1    Jan. 7, 2016

(30) Foreign Application Priority Data
Feb. 20, 2013    (JP) ................. 2013-031263

(51) Int. Cl.
G07C 5/08    (2006.01)
B60R 16/02    (2006.01)
B60R 16/03    (2006.01)

(52) U.S. Cl.
CPC ............ *G07C 5/0841* (2013.01); *B60R 16/02* (2013.01); *B60R 16/03* (2013.01)

(58) Field of Classification Search
CPC ........ G07C 5/0841; B06R 16/02; B06R 16/03
See application file for complete search history.

(56) References Cited

U.S. PATENT DOCUMENTS 6,230,082 B1    5/2001    Harada et al.
7,164,214 B2 *    1/2007    Eisenberger ............ H02J 9/061
                                                                          307/18

(Continued)

FOREIGN PATENT DOCUMENTS

JP        S62040546 A    2/1987
JP        H09050547 A    2/1997

(Continued)

OTHER PUBLICATIONS

International Search Report and Written Opinion (in Japanese with English Translation) for PCT/JP2014/000383, mailed Mar. 11, 2014; ISA/JP.

*Primary Examiner* — Calvin Cheung
(74) *Attorney, Agent, or Firm* — Harness, Dickey & Pierce, P.L.C.

(57) ABSTRACT

A data processing apparatus for a vehicle, which operates upon receiving a power supply from an in-vehicle device, and performs a predetermined data processing, includes: a nonvolatile memory for storing backup data, to be held at a time when stopping the power supply from the in-vehicle device; a predicting device for predicting that the power supply from the in-vehicle device is cut off; and a first backup device for storing the backup data in the nonvolatile memory when the predicting device predicts that the power supply from the in-vehicle device is cut off.

6 Claims, 3 Drawing Sheets

| BACKUP DATA | PRIORITY |
|---|---|
| PRESENT POSITION INFORMATION (LATITUDE, LONGITUDE) | HIGH |
| TIME INFORMATION (TIME STAMP IN BACKUP) | HIGH |
| GPS SATELLITE TRAJECTORY INFORMATION (ALMANAC, EPHEMERIS) | MEDIUM |
| GLONASS SATELLITE TRAJECTORY INFORMATION (ALMANAC, EPHEMERIS) | MEDIUM |
| DEAD RECKONING LEARNING DATA | MEDIUM |
| ZERO POINT VOLTAGE OF GYRO SENSOR | MEDIUM |
| CRYSTAL TEMPERATURE CHARACTERISTIC DATA | LOW |

(56) References Cited

U.S. PATENT DOCUMENTS

| | | |
|---|---|---|
| 2003/0045977 A1 | 3/2003 | Sato et al. |
| 2004/0236859 A1* | 11/2004 | Leistad ............... H04L 12/1881 709/230 |
| 2007/0015630 A1 | 1/2007 | Miyazaki |
| 2007/0189726 A1 | 8/2007 | Yuri et al. |
| 2008/0300731 A1 | 12/2008 | Nakajima et al. |
| 2009/0195928 A1 | 8/2009 | Ogawa |
| 2010/0122018 A1 | 5/2010 | Kawaguchi |
| 2012/0066473 A1* | 3/2012 | Tremaine ................ G06F 12/06 711/206 |
| 2015/0033049 A1* | 1/2015 | Zhao .................... H04M 1/2745 713/320 |
| 2015/0121113 A1* | 4/2015 | Ramamurthy .......... H02J 9/061 713/340 |
| 2015/0199162 A1* | 7/2015 | Platz .................... G08G 1/0112 701/1 |
| 2015/0229369 A1* | 8/2015 | Honary ................ H04B 7/0417 375/267 |

FOREIGN PATENT DOCUMENTS

| | | |
|---|---|---|
| JP | H11105649 A | 4/1999 |
| JP | 2000337918 A | 12/2000 |
| JP | 2003146153 A | 5/2003 |
| JP | 2005166072 A | 6/2005 |
| JP | 2005285202 A | 10/2005 |
| JP | 2006330822 A | 12/2006 |
| JP | 2007023789 A | 2/2007 |
| JP | 2007038782 A | 2/2007 |
| JP | 2007200492 A | 8/2007 |
| JP | 2008176487 A | 7/2008 |
| JP | 2008299656 A | 12/2008 |
| JP | 2008299657 A | 12/2008 |
| JP | 2009093517 A | 4/2009 |
| JP | 2009163587 A | 7/2009 |
| JP | 2009187604 A | 8/2009 |
| JP | 2009264802 A | 11/2009 |
| JP | 2009281814 A | 12/2009 |
| JP | 2010113580 A | 5/2010 |
| JP | 2010160814 A | 7/2010 |
| JP | 2010198214 A | 9/2010 |
| JP | 2011225092 A | 11/2011 |
| JP | 2012112345 A | 6/2012 |

* cited by examiner

FIG. 2

| BACKUP DATA | PRIORITY |
|---|---|
| PRESENT POSITION INFORMATION (LATITUDE, LONGITUDE) | HIGH |
| TIME INFORMATION (TIME STAMP IN BACKUP) | HIGH |
| GPS SATELLITE TRAJECTORY INFORMATION (ALMANAC, EPHEMERIS) | MEDIUM |
| GLONASS SATELLITE TRAJECTORY INFORMATION (ALMANAC, EPHEMERIS) | MEDIUM |
| DEAD RECKONING LEARNING DATA | MEDIUM |
| ZERO POINT VOLTAGE OF GYRO SENSOR | MEDIUM |
| CRYSTAL TEMPERATURE CHARACTERISTIC DATA | LOW |

FIG. 3

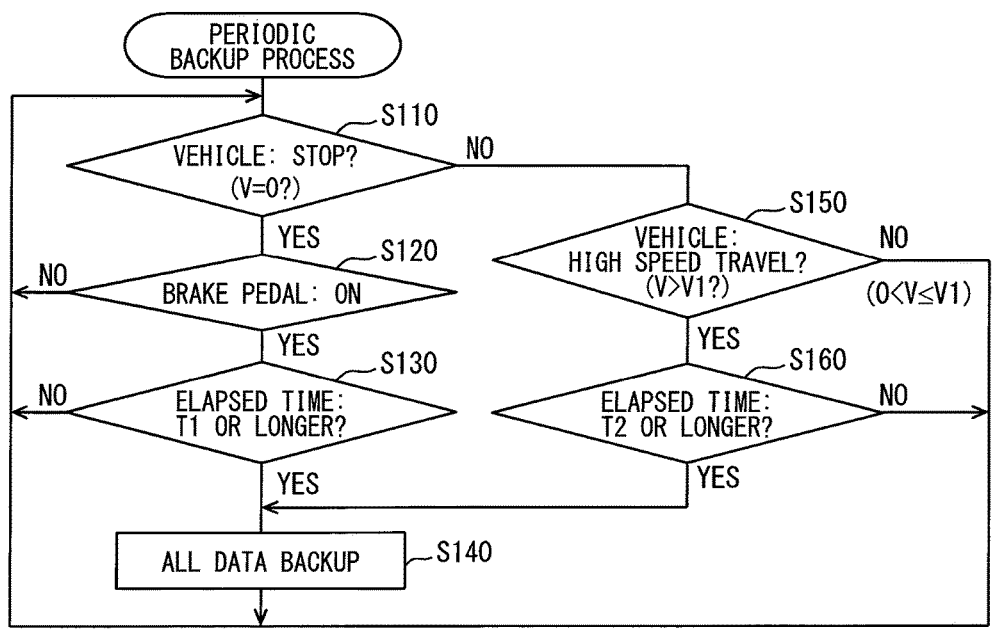

DATA PROCESSING APPARATUS FOR VEHICLE

CROSS REFERENCE TO RELATED APPLICATIONS

This application is a U.S. National Phase Application under 35 U.S.C. 371 of International Application No. PCT/JP2014/000383 filed on Jan. 27, 2014 and published in Japanese as WO 2014/129112 A1 on Aug. 28, 2014. This application is based on and claims the benefit of priority from Japanese Patent Application No. 2013-031263 filed on Feb. 20, 2013. The entire disclosures of all of the above applications are incorporated herein by reference.

TECHNICAL FIELD

The present disclosure relates to a data processing apparatus for a vehicle which is mounted in a vehicle and performs predetermined data processing.

BACKGROUND ART

A vehicle data processing apparatus such as a navigation system, which is mounted in a vehicle and performs predetermined data processing, operates upon receiving a power supply from a vehicle battery or another in-vehicle device when a vehicle drive switch (specifically, accessory switch, ignition switch, etc.) is in an on state.

Therefore, in the vehicle data processing apparatus of that type, when the vehicle drive switch becomes in an off state, data (for example, position data of the vehicle in the navigation system) required for data processing after starting next time is saved in a backup memory circuit (for example, refer to Patent Literature 1 and Patent Literature 2).

Incidentally, in the conventional art, it is assumed that a backup power is supplied to the vehicle data processing apparatus from an internal battery or the vehicle battery for at least a period of time required for backing up data since the vehicle drive switch turns off.

In other words, even if the accessory switch or the ignition switch turns off to cut off a main power supply, data can be written into a memory circuit.

For that reason, in the vehicle data processing apparatus in which a power supply route from the in-vehicle device is of one system, and no backup internal battery is provided, the above conventional art cannot be applied, and data cannot be backed up at the time of cutting off the power supply.

On the other hand, as a method for solving the above problems, it is conceivable that when the vehicle drive switch is in the on state, and the power is supplied from the in-vehicle device to the vehicle data processing apparatus, data is periodically written into the memory circuit (in this example, nonvolatile memory that can hold data without receiving the power supply).

However, in the case where data is periodically written as described above, when the period is long, data immediately before the vehicle data processing apparatus stops the operation cannot be saved in the nonvolatile memory.

When the period in which data is written into the nonvolatile memory is shortened, data immediately before the vehicle data processing apparatus stops the operation can be saved. However, in that case, a frequency at which data is written into the nonvolatile memory increases.

As a result, the above case causes such a problem that the number of writing data into the nonvolatile memory reaches the number of times for compensation in a short period of time, the life of the nonvolatile memory is shortened, and the exchange of the nonvolatile memory is required.

PRIOR ART LITERATURES

Patent Literature

Patent Literature 1: JP-2009-93517 A
Patent Literature 2: JP-2009-264802 A

SUMMARY OF INVENTION

It is an object of the present disclosure to provide a data processing apparatus for a vehicle which operates upon receiving a power supply from an in-vehicle device in which data immediately before the power supply is cut off can be saved in a nonvolatile memory without the provision of a data backup power supply.

According to an aspect of the present disclosure, a data processing apparatus for a vehicle, which operates upon receiving a power supply from an in-vehicle device, and performs a predetermined data processing, includes: a nonvolatile memory for storing backup data, to be held at a time when stopping the power supply from the in-vehicle device, among data utilized in the data processing; a predicting device for predicting that the power supply from the in-vehicle device is cut off, based on vehicle operation by a driver or a situation around the vehicle; and a first backup device for storing the backup data in the nonvolatile memory when the predicting device predicts that the power supply from the in-vehicle device is cut off.

According to the above data processing apparatus for a vehicle, the backup data can be stored in the nonvolatile memory before the power supply from the in-vehicle device is cut off. Because there is no need to additionally provide a data backup power supply for the purpose of storing the backup data in the nonvolatile memory, the device configuration can be simplified.

BRIEF DESCRIPTION OF DRAWINGS

The above and other objects, features and advantages of the present disclosure will become more apparent from the following detailed description made with reference to the accompanying drawings. In the drawings:

FIG. 2 is an illustrative view illustrating the type of backup data stored in a nonvolatile memory;

FIG. 3 is a flowchart illustrating a periodic backup process to be executed by an arithmetic circuit of a detection unit.

EMBODIMENTS FOR CARRYING OUT INVENTION

Hereinafter, an embodiment of this disclosure will be described with reference to the attached drawings.

The present disclosure is not interpreted with the limit by the embodiments described below. In addition, modes in which a part of the configurations of the following embodiments may be omitted as long as the problem can be solved are also encompassed by the embodiments of the present disclosure. Moreover, all modes considerable without departing from the essence of disclosure identified by only wording described in the claims are encompassed by the embodiments of the present disclosure. Symbols used for description of the following embodiments are also appropriately used in the claims, but used for the purpose of facilitating the understanding of the disclosure according to the respective claims, and are not intended to limit the technical scopes of the disclosure according to the respective claims.

In this embodiment, this disclosure is applied to a navigation system 2 for a vehicle.

Figure 1:
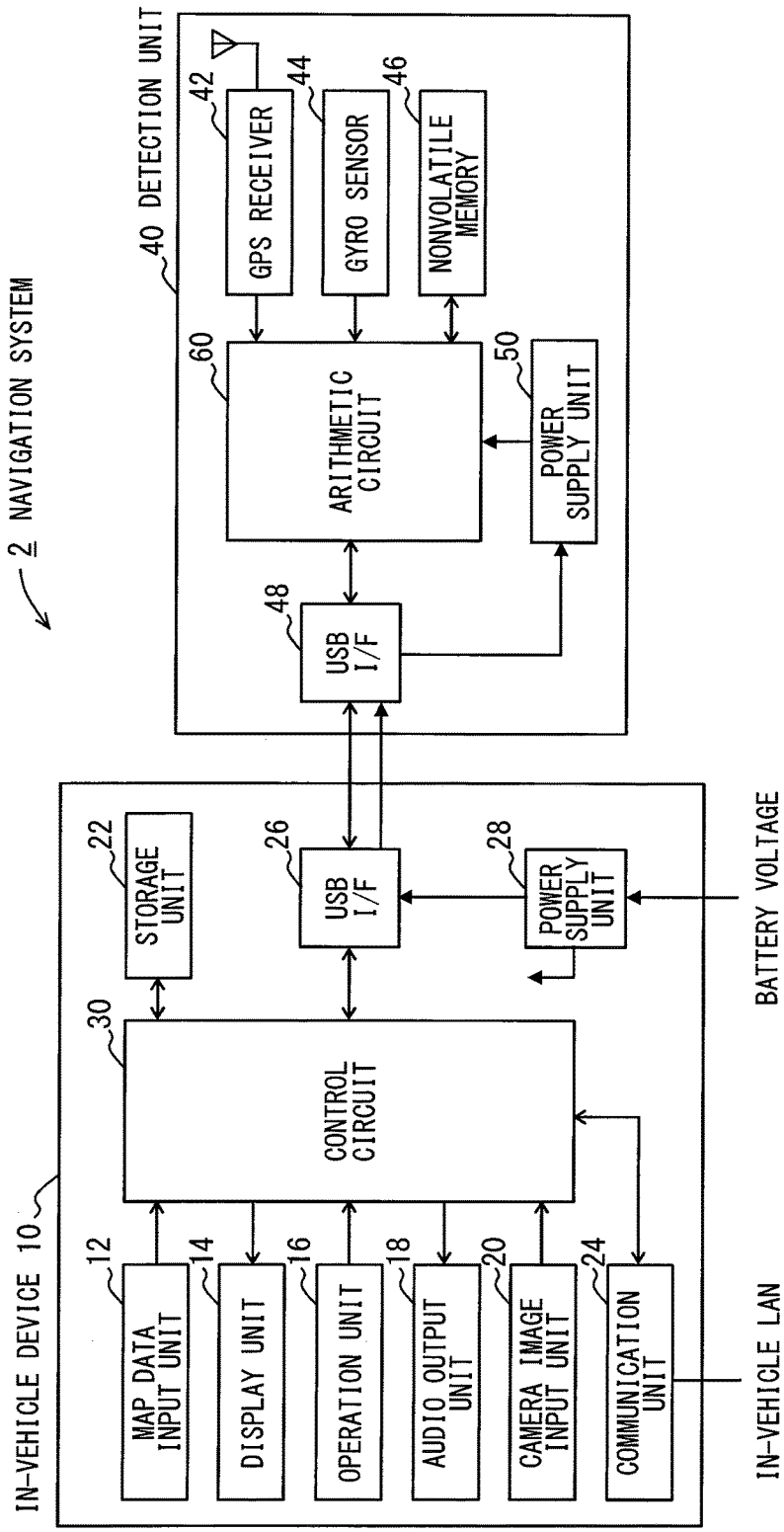
FIG. 1 is a block diagram illustrating a configuration of an overall navigation system according to an embodiment.

As illustrated in FIG. 1, the navigation system 2 according to this embodiment includes an in-vehicle device 10 which is an apparatus main body, and a detection unit 40 that detects the present position and a traveling direction of a vehicle.

In those components, the in-vehicle device 10 includes a map data input unit 12, a display unit 14, an operation unit 16, an audio output unit 18, a camera image input unit 20, a storage unit 22, a communication unit 24, a USB I/F (I/F: interface) 26, a power supply unit 28, and a control circuit 30.

In this example, the map data input unit 12 is configured to take in map data such as so-called map matching data, map drawing data, and route search data for improving a position detection precision from a predetermined storage medium (CD-ROM, DVD-ROM, hard disk, etc.).

The display unit 14 is configured by a liquid crystal display or an organic EL display, and the operation unit 16 includes a touch panel integrated with the display unit 14, and mechanical switches disposed around the display unit 14.

The audio output unit 18 is configured to reproduce music or voice for travel guidance, and output reproduced music or voice from a speaker, and the camera image input unit 20 is configured to capture images around the vehicle from cameras disposed around the vehicle (forward, backward, right and left sides, etc.).

The storage unit 22 is configured by a readable and writable storage medium such as an SD card, an HDD, an SSD, or a flash-ROM, and stores a program and various pieces of data for realizing a function as the navigation system therein.

The communication unit 24 is configured to perform a communication with another in-vehicle device through an in-vehicle LAN such as a CAN or an LIN, and used to acquire various vehicle information such as a vehicle velocity, the operation state of a parking brake, or the shift position of an automatic transmission from another in-vehicle device.

Those pieces of vehicle information do not always need to be acquired through the in-vehicle LAN, and may be acquired directly from a vehicle velocity sensor, a brake sensor, or a shift position sensor through a predetermined interface.

The USB I/F 26 is configured to perform a communication with the detection unit 40, and supply a power to the detection unit 40.

The power supply unit 28 is configured to generate a driving supply voltage (DC constant voltage) to the respective components of the in-vehicle device 10 and a supply voltage to be applied to the detection unit 40, upon receiving a power supply from a vehicle battery when an accessory switch (not shown) of the vehicle is in an on state.

The control circuit 30 is configured by a known microcomputer having a CPU, a ROM, a RAM, an I/O, and bus lines for connecting those components to each other.

The control circuit 30 is connected to the above respective units, and executes the program stored in the storage unit 22 to realize the function as the navigation system, upon receiving the supply voltage from the power supply unit 28.

In other words, the control circuit 30 performs the position detection using the detection unit 40, the map display on the display unit 14 based on the map data taken in through the map data input unit 12, the display of a vehicle mark on the display map, the voice guidance using the audio output unit 18, and the function setting based on an instruction from the operation unit 16.

The control circuit 30 displays the image around the vehicle, which is input through the camera image input unit 20, on the display unit 14 on the basis of an instruction from the operation unit 16, and performs an operation assistance to the driver.

On the other hand, the detection unit 40 includes a GPS receiver 42 that receives an electric wave from a GPS satellite or a GLONASS satellite to perform position detection, a gyro sensor 44 that detects an angular velocity, a nonvolatile memory 46, a USB I/F 48, a power supply unit 50, and an arithmetic circuit 60.

The nonvolatile memory 46 is configured to hold the present position calculated by the arithmetic circuit 60 and data used at the time of the calculation in a period of time since the power supply from the in-vehicle device 10 is cut off until the power supply next starts (that is, when the accessory switch is in the off state), and is configured by a flash memory.

The USB I/F 48 is connected to the USB I/F 26 of the in-vehicle device 10 through a USB cable to take in the supply voltage supplied from the in-vehicle device 10, and performs a communication with the in-vehicle device 10.

The power supply unit 50 is configured to generate a supply voltage (DC constant voltage) for driving an internal circuit in the detection unit 40 upon receiving the supply voltage input from the USB I/F 48.

The arithmetic circuit 60 is configured by a known microcomputer having a CPU, a ROM, a RAM, an I/O, and bus lines for connecting those components to each other, and connected to the above respective units.

The arithmetic circuit 60 detects the present position and the traveling direction of the vehicle through a known dead reckoning on the basis of a detection signal from the GPS receiver 42, a detection signal from the gyro sensor 44, and vehicle information (vehicle velocity, etc.) acquired from the in-vehicle device 10, and outputs the detection result to the in-vehicle device 10.

When the arithmetic circuit 60 starts upon receiving the power supply from the power supply unit 50, and when the vehicle stops from a travel state, the arithmetic circuit 60 samples the output of the gyro sensor 44 in a predetermined period, and sets a zero point voltage of the output of the gyro sensor 44.

Figure 4C:
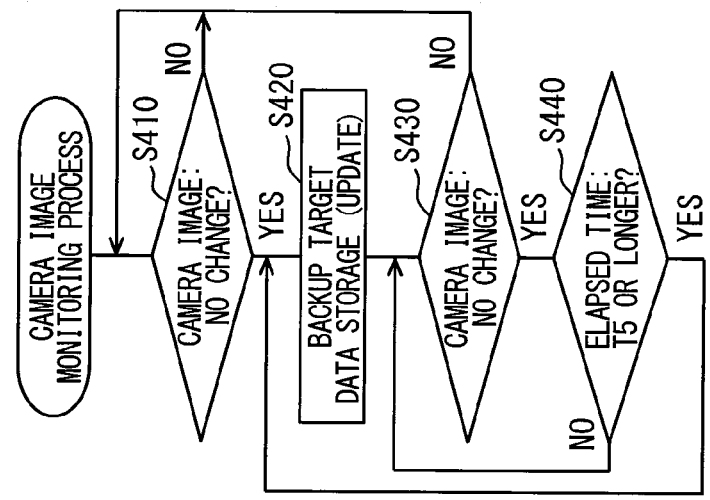
FIGS. 4A to 4C are flowcharts illustrating a monitoring process to be executed by the arithmetic circuit of the detection unit.
Figure 4B:
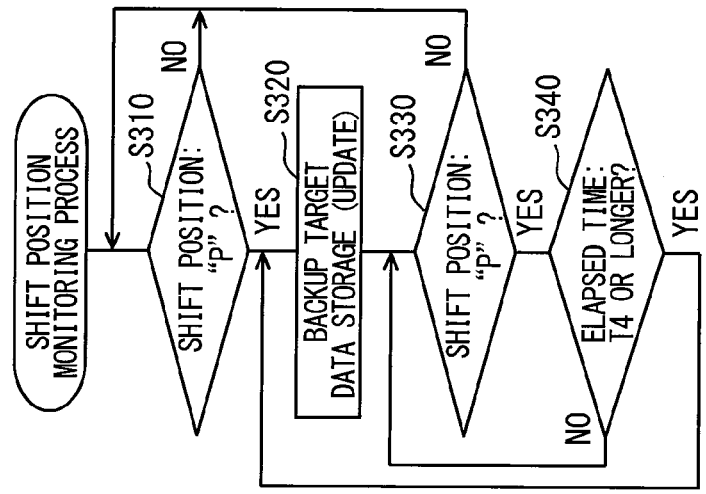
Figure 4A:
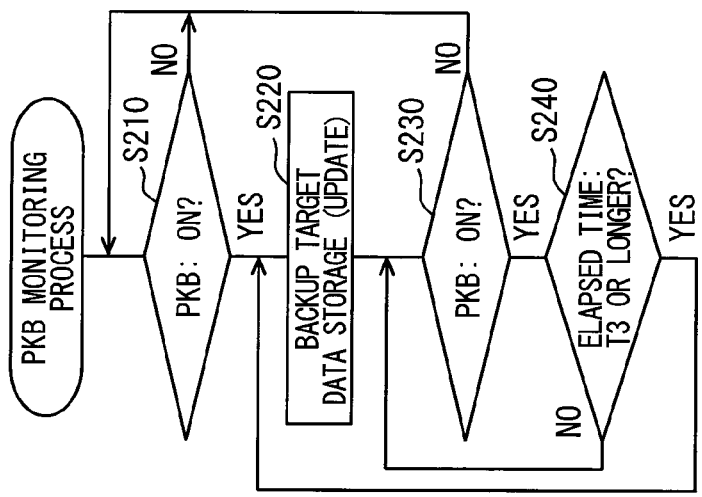

The arithmetic circuit 60 executes a periodic backup process illustrated in FIG. 3 and various monitoring processes illustrated in FIGS. 4A to 4C so that data corresponding to the vehicle position at the time of cutting off the power supply is saved in the nonvolatile memory 46, when the power supply from the in-vehicle device 10 is cut off.

In other words, the detection unit 40 according to this embodiment has no backup power for supplying the power to the arithmetic circuit 60 when the power supply from the in-vehicle device 10 is cut off.

For that reason, when the accessory switch of the vehicle becomes in the off state, and the power supply from the in-vehicle device 10 to the detection unit 40 is cut off, the arithmetic circuit 60 stops the operation immediately, and cannot save the present position information required at a next start time in the nonvolatile memory 46 after the power supply has been cut off.

Under the circumstances, in this embodiment, with the execution of a monitoring process illustrated in FIGS. 4A to 4C, it is predicted that the vehicle stops, and the driver turns off the accessory switch (in other words, the power supply from the in-vehicle device 10 is cut off), and the various backup data including the present position is stored in the nonvolatile memory 46.

The above prediction cannot be performed before the power supply from the in-vehicle device 10 is cut off, by only the monitoring process. Alternatively, even if the prediction can be performed, it is conceivable that the power supply from the in-vehicle device 10 is immediately cut off by the switch operation of the driver, and the backup data cannot be saved in the nonvolatile memory 46.

Under the circumstances, in this embodiment, aside from the monitoring process illustrated in FIGS. 4A to 4C, with the execution of the periodic backup process illustrated in FIG. 3, the backup data is periodically stored in the nonvolatile memory 46 at the time of stopping the vehicle or at the time of traveling at a high speed.

As the backup data stored in the nonvolatile memory 48, the data illustrated in FIG. 2 is set in this embodiment.

In other words, the nonvolatile memory 48 stores the present position information (latitude, longitude), time information, GPS satellite trajectory information, GLONASS satellite trajectory information, dead reckoning learning data, a zero point voltage of the gyro sensor 44, and crystal temperature characteristic data are stored as the backup data.

In this example, the time information (time stamp) is information indicative of a time at the time of data backup, and configured by the time information obtained from satellite radio waves received by the GPS receiver 42, or the time information (RTC: real time clock) acquired from the in-vehicle device 10 side.

The GPS satellite trajectory information and the GLONASS satellite trajectory information are trajectory information for allowing the GPS receiver 42 to find out available satellite for position detection, and the nonvolatile memory 48 stores the respective data of almanac (almanac) required to look for the satellite and ephemeris (ephemeris) required to obtain a position of the satellite therein.

The dead reckoning learning data is data used in identifying the present position through the dead reckoning calculation, such as interpolation data that interpolates an error between a vehicle travel distance obtained by vehicle velocity pluses and a vehicle travel distance obtained by the GPS information, and the crystal temperature characteristic data is temperature characteristic data of a reference frequency clock.

A priority such as high, medium, and low is set for the above respective backup data, and in the monitoring process illustrated in FIGS. 4A to 4C, only the backup data (that is, priority: high) high in priority (present position information and time information in the drawings) is stored in the nonvolatile memory 48.

Next, the periodic backup process and the monitoring process to be executed by the arithmetic circuit 60 as described above will be described with reference to flowcharts illustrated in FIGS. 3, and 4A to 4C.

Those processes are repetitively executed in the arithmetic circuit 60 during the operation of the arithmetic circuit 60 as one of main routines.

As illustrated in FIG. 3, in the periodic backup process, it is first determined whether a vehicle velocity V is zero, or not, in S110 (S represents a step) (in other words, whether the vehicle stops, or not).

If it is determined that the vehicle velocity V is zero in S110, the flow proceeds to S120, and it is determined whether a brake pedal is in an on state, or not (in other words, whether to depress the brake pedal, or not). If the brake pedal is in the on state, the flow proceeds to S130.

The vehicle velocity determination in 5110 and the on/off determination of the brake pedal in S120 are performed on the basis of the vehicle information acquired from the in-vehicle device 10.

Then, it is determined whether an elapsed time is equal to or longer than a standby time T1, or not, in S130. In the standby time T1, it is determined that the vehicle velocity V is zero, and the brake pedal is in the on state in S110 and S120, respectively.

If it is determined that the elapsed time is equal to or longer than the predetermined standby time T1 in S130, the flow proceeds to S140. The latest values of all the data set as the backup data are stored in the nonvolatile memory 46, and all of the backup data stored in the nonvolatile memory 46 is updated.

On the other hand, if it is determined that the brake pedal is not in the on state (in other words, not depressed) in S120, or if it is determined that the elapsed time does not reach the standby time T1 in S130, the flow again proceeds to S110, and the zero determination of the vehicle velocity V is performed.

If it is determined that the vehicle velocity V is not zero in S110, the flow proceeds to S150, and it is determined whether the vehicle velocity V is larger than a preset threshold V1 for high speed determination, or not.

If it is determined that the vehicle velocity V is larger than the threshold V1, and the vehicle travels at a high speed in S150, the flow proceeds to S160. Conversely, if it is determined that the vehicle velocity V is equal to or smaller than the threshold V1 (in other words, the velocity is traveling at a low speed), the flow again proceeds to S110.

It is determined whether an elapsed time is equal to or longer than a predetermined standby time T2, or not, in S160. In the predetermined standby time T2, it is determined that the vehicle travels at a high speed in the series of processes in S110 and S150. If the elapsed time is equal to or longer than the standby time T2, the flow proceeds to S140, all of the backup data is stored in the nonvolatile memory 46 whereas if not, the flow again proceeds to S110.

If all of the backup data is stored in the nonvolatile memory 46 in S140, the elapsed time used for the time determination in S130 or S160 returns to a default value 0.

As a result, when the vehicle velocity V is zero, and the brake pedal is depressed, or when the vehicle travels at a high speed, the backup data in the nonvolatile memory 46 is updated periodically for every standby time T1 or T2.

The reason why the backup data in the nonvolatile memory 46 is updated when the vehicle velocity V is zero, and the brake pedal is depressed as described above is because it is conceivable that the backup data cannot be updated in the monitoring process to be described later.

The reason why a condition for implementing the backup in that time is set as "when the standby time T1 or longer has been elapsed" is because when the vehicle temporarily stops for stop light, the backup data is prevented from being unnecessarily written into the nonvolatile memory 46 to increase the writing frequency.

The reason why the backup data is periodically written when the vehicle travels at a high speed is because when the vehicle travels at the high speed, the travel distance is large, and when the backup data cannot be updated before the accessory switch turns off through the processes of S120 to S140 to be executed at the time of stopping the vehicle, and the monitoring process to be described later, a data error becomes large.

The reason why the backup data is not updated when the vehicle travels at a low speed is because the travel distance is slight. In other words, the reason is because in a state where the travel distance is small, there is no need to update the backup data, and if the backup data is to be updated, the number of writing the backup data into the nonvolatile memory 46 unnecessarily increases, and the life of the nonvolatile memory 46 may be shortened.

FIGS. 4A to 4C illustrate three monitoring processes of a PKB monitoring process, a shift position monitoring process, and a camera image monitoring process.

With the execution of one of those three monitoring processes, or the combination of plural monitoring processes, the arithmetic circuit 60 predicts that the accessory switch turns off to cut off the power supply from the in-vehicle device 10, and updates the backup data (in detail, part of backup data) in the nonvolatile memory 46 to the latest values.

Hereinafter, the respective monitoring processes will be described.

In the PKB monitoring process, it is first determined whether the parking brake of the vehicle is in the on state, or not, in S210 (in other words, whether to operate, or not).

If the parking brake is not in the on state, S210 is again executed to wait until the parking brake becomes in the on state. If the parking brake is in the on state, it is predicted that the driver turns off the accessory switch, and the flow proceeds to S220.

In S220, data "high" in the priority (in FIG. 2, the present position information and the time information) among the backup data illustrated in FIG. 2 is set as the backup target data, the latest values of the data are stored in the nonvolatile memory 46, and the backup target data "high" in the priority is updated.

Then, it is determined whether the parking brake of the vehicle is continued to be in the on state, or not, in S230. If the parking brake is in the off state, the flow proceeds to S210, and if the parking brake is continued to be in the on state, the flow proceeds to S240.

After the backup target data in the nonvolatile memory 46 has been updated in S220, it is determined whether a predetermined period of time T3 or longer is elapsed, or not, in S240, and if the predetermined period of time T3 or longer is not elapsed, the flow again proceeds to S230.

If it is determined that the predetermined period of time T3 or longer is elapsed after the backup target data has been updated in S240, the flow proceeds to S220, and the latest value of the backup target data is stored in the nonvolatile memory 46.

In other words, it is determined whether the on state of the parking brake is continued for the predetermined period of time T3 or longer, or not, in S230 and S240, and if the on state of the parking brake is continued, the process of S220 is executed for every predetermined period of time T3.

As described above, in the PKB monitoring process, when the parking brake becomes in the on state, it is predicted that the driver turns off the accessory switch, and the backup target data "high" in the priority among the backup data stored in the nonvolatile memory 46 is updated to the latest value.

Therefore, according to the PKB monitoring process, the backup target data "high" in the priority can be updated to the latest value during a period since the parking brake operates until the accessory switch turns off, and the power supply from the in-vehicle device 10 is cut off.

The backup target data is updated for every predetermined period of time T3 during a period in which the on state of the parking brake is continued (in other words, when the parking brake is in the on state, and the accessory switch is not off).

For that reason, for example, even when the vehicle is placed on a carriage for movement, and moves and rotates in a parking lot, the latest value of the backup target data can be written into the nonvolatile memory 46.

Then, in the shift position monitoring process, it is first determined whether the shift position of the automatic transmission of the vehicle is "P (parking)" position, or not, in S310.

If the shift position of the automatic transmission is not the "P" position, S310 is again executed to wait until the shift position becomes "P" position. If the shift position is "P" position, it is predicted that the driver turns off the accessory switch, and flow proceeds to S320.

The latest value of the backup target data is stored in the nonvolatile memory 46 in S320 as with the above S220 to update the backup target data "high" in the priority.

Then, it is determined whether the shift position of the automatic transmission is held in the "P" position, or not, in S330. The flow proceeds to S310 if the shift position changes from the "P" position whereas the flow proceeds to S340 if the shift position is held in the "P" position.

It is determined whether a predetermined period of time T4 or longer is elapsed after the backup target data in the nonvolatile memory 46 has been updated in S320, or not, in S340, and if the predetermined period of time T4 or longer is not elapsed, the flow again proceeds to S330.

If it is determined that the predetermined period of time T4 or longer is elapsed after the backup target data has been updated in S340, the flow proceeds to S320, and the latest value of the backup target data is stored in the nonvolatile memory 46.

In other words, it is determined whether a state in which the shift position of the automatic transmission is "P" position is continued for the predetermined period of time T4 or longer, or not, in S330 and S340. If the shift position of the automatic transmission is "P" position, the process of S320 is executed for every predetermined period of time T4.

As described above, in the shift position monitoring process, it is predicted on the basis of the shift position of the automatic transmission that the driver turns off the accessory switch, and the backup target data stored in the nonvolatile memory 46 is updated to the latest value.

Therefore, according to the shift position monitoring process, the same advantages as those in the PKB monitoring process described above can be obtained.

Then, in the camera image monitoring process, it is first determined whether an image (camera image) around the vehicle, which is captured by the camera, stops, or not, in other words, whether the vehicle stops, or not, in S410.

The determining process of S410 may be implemented by acquiring the camera image from the in-vehicle device 10, and monitoring a change in the image. Alternatively, the determining process of S410 may be implemented by determining whether the camera image changes, or not, on the in-vehicle device 10 side, and acquiring the determination result.

If it is determined that the camera image stops in S410, it is predicted that the vehicle completely stops, and the driver turns off the accessory switch to park the vehicle, and the flow proceeds to S420.

The latest value of the backup target data is stored in the nonvolatile memory 46 in S420 as with the above S220 and S320 to update the backup target data "high" in the priority.

Then, it is determined whether the camera image stops, or not, in S430 as with S410. If the camera image does not stop, the flow proceeds to S410, and if the camera image stops, the flow proceeds to S440.

It is determined whether a predetermined period of time T5 or longer is elapsed after the backup target data in the nonvolatile memory 46 has been updated in S420, or not, in S440, and if the predetermined period of time T5 or longer is not elapsed, the flow again proceeds to S430.

If it is determined that the predetermined period of time T5 or longer is elapsed after the backup target data has been updated in S440, the flow proceeds to S420, and the latest value of the backup target data is stored in the nonvolatile memory 46.

In other words, it is determined whether a state in which the camera image stops (in other words, a state in which the vehicle completely stops) is continued for the predetermined period of time T5 or longer, or not, in S430 and S440. If the camera image stops, the process of S420 is executed for every predetermined period of time T5.

As described above, in the camera image monitoring process, it is predicted on the basis of the camera image that the driver turns off the accessory switch, and the backup target data stored in the nonvolatile memory 46 is updated to the latest value. Therefore, according to the camera image monitoring process, the same advantages as those in the PKB monitoring process and the shift position monitoring process described above can be obtained.

The reason why only the data "high" in the priority among the backup data is selectively backed up in the above respective monitoring processes is because it is predicted that the driver turns off the accessory switch, and the power supply from the in-vehicle device 10 is cut off, in the respective monitoring processes.

In other words, in the prediction in the above respective monitoring processes, a period of time until the driver actually turns off the accessory switch after the prediction is unclear. Therefore, a case in which that time is extremely short, and all of the backup data cannot be stored is conceivable.

Under the circumstances, in the above respective monitoring processes, the type of the backup data stored in the nonvolatile memory 48 is limited to that "high" in the priority with the results that a time required for writing data is shortened, and the important backup data (the present position information and the time information in this embodiment) is prevented from being not generated.

In this example, in this embodiment, the detection unit 40 corresponds to a vehicle data processing apparatus of the present disclosure, and the arithmetic circuit 60 corresponds to predicting device, first backup device, and second backup device of the present disclosure.

The function of the predicting device according to the present disclosure is realized by S210, S310, and S410 in the above respective monitoring processes among the processes executed by the arithmetic circuit 60. The function of the first backup device is realized by the processes of S220 to S240, S320 to S340, and S420 to S440 in the above respective monitoring processes, and the function of the second backup device is realized by the periodic backup process in S110 to S180.

Hereinbefore, embodiments of the present disclosure have been described. However, the present disclosure is not limited to the above-described embodiments, and various aspects can be made in a range not departing from the technical range of the present disclosure.

For example, in the description of the above embodiments, with the execution of at least one of the PKB monitoring process, the shift position monitoring process, and the camera image monitoring process illustrated in FIGS. 4A to 4C, the arithmetic circuit 60 predicts that the power supply from the in-vehicle device 10 is cut off, and updates the backup target data in the nonvolatile memory 46 to the latest value.

However, in the above monitoring process, it may be predicted from the vehicle operation by the driver, or the situation around the vehicle that the power supply from the in-vehicle device 10 is cut off, and the present disclosure is not limited to the above three types of monitoring processes.

In the above respective monitoring process and the periodic backup process, the time intervals T1 to T5 in periodically writing the backup data in the nonvolatile memory 46 may be appropriately set, and for example, the time intervals T3 to T5 in the monitoring process may be identical with each other.

In the description of the above embodiment, the detection unit 40 acquires various pieces of vehicle information (vehicle velocity, operating state of the vehicle by the driver, situation around the vehicle, etc.) from the in-vehicle device 10, and controls write timing of the backup data into the nonvolatile memory 46.

However, there are some of the vehicle data processing apparatuses which cannot acquire the vehicle information from the in-vehicle device, such as the navigation system that operates, independently, upon receiving the power supply from a cigarette socket of the vehicle.

Under the circumstances, in the vehicle data processing apparatus of the above type, the present disclosure can be realized by detecting the vehicle velocity or the motion of the vehicle body with the use of the GPS receiver 42 or the gyro sensor 44, and the write timing of the backup data into the nonvolatile memory 46 is controlled on the basis of the detection result.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data processing apparatus for a vehicle, which operates upon receiving a power supply from an in-vehicle device, and performs a predetermined data processing, the data processing apparatus comprising:
   a nonvolatile memory for storing backup data, to be held at a time when stopping the power supply from the in-vehicle device, among data utilized in the data processing,
      wherein the backup data includes high priority data and secondary data,
      wherein the backup data includes current position information of the vehicle, time information, and GPS satellite trajectory information, and
      wherein the current position information and the tine information are identified as high priority data, and the GPS satellite trajectory information is identified as secondary data;
   a predicting device for predicting that the power supply from the in-vehicle device is cut off, based on vehicle operation by a drive or a situation around the vehicle;
   a first backup device for storing the high priority data from among the backup data in the nonvolatile memory when the predicting device predicts that the power supply from the in-vehicle device is cut off; and
   a second backup device for storing all of the backup including the high priority data and the secondary data in the nonvolatile memory every time a predetermined standby time elapses at a time when traveling with a vehicle velocity equal to or higher than a predetermined speed, and at a time when stopping.

2. The data processing apparatus for a vehicle according to claim 1, wherein:
   the first backup device repetitively stores the backup data in the nonvolatile memory at predetermined time intervals when the predicting device predicts that the power supply from the in-vehicle device is cut off.

3. The data processing apparatus for a vehicle according to claim 1, wherein:
   the predicting device predicts that the power supply from the in-vehicle device is cut off when a parking brake becomes in an on state.

4. The data processing apparatus for a vehicle according to claim 1, wherein:
   the predicting device predicts that the power supply from the in-vehicle device is cut off when a shift position becomes a parking position.

5. The data processing apparatus for a vehicle according to claim 1, wherein:
   the predicting device predicts that the power supply from the in-vehicle device is cut off when an image around the vehicle, which is acquired by a camera, is unchanged for a predetermined time period.

6. A data processing apparatus for a vehicle, which operates upon receiving a power supply from an in-vehicle device, and executes a predetermined data processing, the data processing apparatus comprising:
   a nonvolatile memory for storing backup data among data utilized in the data processing, wherein the backup data includes different data types and each of the data types is pre-identified with a priority level, wherein the priority level is one of high priority, low priority, or medium priority;
   a predicting device for predicting that the power supply from the in-vehicle device is cut off, based on vehicle operation by a driver or a situation around the vehicle;
   a first backup device for storing, from among the backup data, data types identified as the high priority in the nonvolatile memory when the predicting device predicts that the power supply from the in-vehicle device is cut off; and
   a second backup device for storing all of the backup data in the nonvolatile memory every time a predetermined standby time elapses at a time when traveling with a vehicle velocity equal to or higher than a predetermined speed, and at a time when stopping;
   wherein the backup data includes current position information of the vehicle, time information, and GPS satellite trajectory information, and wherein the current position information and the time information are identified as high priority, and the GPS satellite trajectory information is identified as medium priority.

* * * * *